June 20, 1967 N. LEVENBERG 3,326,616
BEARING STRUCTURE FOR SUSPENSION TYPE DRAWERS
Filed Oct. 24, 1965
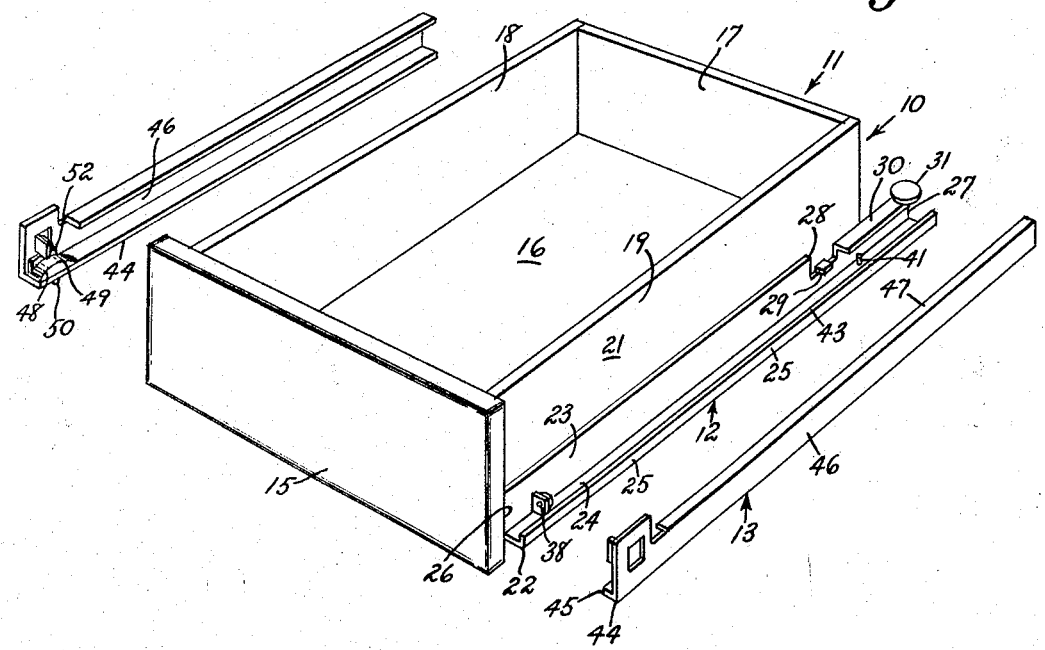

United States Patent Office

3,326,616
Patented June 20, 1967

3,326,616
BEARING STRUCTURE FOR SUSPENSION
TYPE DRAWERS
Nat Levenberg, Brooklyn, N.Y.
(1345 Halsey St., Ridgewood, N.Y. 11227)
Filed Oct. 24, 1965, Ser. No. 504,781
1 Claim. (Cl. 312—341)

ABSTRACT OF THE DISCLOSURE

Briefly stated, the invention contemplates the provision of button type low friction synthetic resinous bearings which are provided with planar upper surfaces and arcuate peripheral surfaces, and which are mounted in such manner as to be capable of rotation during movement of a drawer with respect to a desk or other relatively fixed structure, while rolling upon the arcuate surfaces thereof, while simultaneously supporting for sliding movement a bearing load having a line of action parallel to the axis of the above mentioned rotation.

---

This invention relates generally to the field of drawer suspension systems of the type used for supporting file cabinet drawers, desk drawers and the like, and more particularly to an improved form thereof in which the relatively sliding elements are supported by nylon or other synthetic resinous type bearings rather than metallic rollers or ball bearings.

It is among the objects of the present invention to provide a simple, rugged suspension system which may be manufactured to relatively large commercial tolerances, but which may be virtually jamp-proof upon the occurrence of a closing or opening motion tending to cant a drawer to either side of its principal longitudinal axis.

Another object of the invention lies in the provision of a bearing structure of nylon or other synthetic resinous material having a planar surface over which a suspension element may slide, and a pivotal mounting permitting limited rotation thereabout should, upon the occurrence of a canting motion, the arcuate peripheral surface of the bearing be contacted.

Yet another object of the invention lies in the provision of an improved synthetic resinous bearing construction which may be easily installed upon a drawer suspension element, thereby maintaining the cost of assembly of constructions of this type at a low level.

A further object of the invention lies in the provision of an improved bearing structure for suspension-type drawers which may be readily disassembled for repair or replacement of any of the component parts thereof.

A feature of the disclosed embodiment lies in the ease of removal and replacement of individual drawers with regard to the structure in which they are installed by those possessed of only ordinary skill.

These objects and features, as well as other incidental ends and advantages, will more fully appear in the progress of the following disclosure, and be pointed out in the appended claim.

In the drawing, to which reference will be made in the specification, similar reference characters have been employed to designate corresponding parts throughout the several views.

FIGURE 1 is a fragmentary exploded view in perspective of an embodiment of the invention.

FIGURE 2 is an enlarged fragmentary side elevational view thereof, partly broken away to show detail.

FIGURE 3 is a fragmentary end elevational view thereof as might be seen from the righthand portion of FIGURE 2.

FIGURE 4 is an enlarged fragmentary plan view thereof, as might be seen from the upper portion of FIGURE 3.

In accordance with the invention, the device, generally indicated by reference character 10, comprises broadly: a drawer element 11, first suspension elements 12 and second suspension elements 13.

The drawer element 11 may be of conventional construction of either wood or metal materials, and includes a front wall member 15, a bottom wall member 16, a rear wall member 17 and side wall members 18 and 19.

The first suspension elements 12 are two in number, and are symmetrically arranged on either side of the drawer element 11, being mounted upon the outer surface 21 of the side wall members 18 and 19. Accordingly, a description of one of said elements will serve equally well to describe the other, thereby avoiding needless repetition.

A suspension element 12 therefore includes an elongated channel member 22 having an inner vertical wall 23, a lower wall 24 and an outer vertical wall 25.

The inner vertical wall 23 extends between an outer end 26 and an inner end 27 and is secured to the above-mentioned outer surface 21 by any convenient means such as welding or by means of screws (not shown). A short distance from the inner end 27, the wall 23 is modified to form a notched portion 28 from which a horizontal tab 29 extends. Rearwardly of the notched portion 28 is a horizontal flange 30 mounting upon the upper surface thereof a bearing member 31 of nylon or other suitable synthetic resin. The member 31 is of button-like configuration, including a head portion 32 forming an upper surface 33 of planar configuration, and an arcuate peripheral surface 34. Extending from a lower surface 34a is a mounting shank or pintle 35 which resiliently engages an opening 36 in the horizontal flange 30. Owing to the inherent slippery quality of the nylon surface, the pintle 35 forms a pivotal mounting permitting limited rotation of the bearing member 31 upon engagement of the peripheral surface 34, as will more fully appear hereinbelow. From a consideration of FIGURES 1 and 3, it will be apparent that the surface 34 extends outwardly of the outermost edge 37 of the horizontal flange 30, thereby preventing any horizontal rubbing contact between the first suspension element 12 and the related second suspension element 13.

The lower wall 24 supports a vertical tab 38 (see FIGURES 1 and 2), the tab 38 mounting a cushion member 39 engageable with a member 40 on the second suspension element 13, which engagement determines the innermost limit of the path of travel of the drawer element 11. A second nylon bearing 41 is mounted on the lower surface of the lower wall 24, the bearing 41 being of a smaller over-all diameter than that of the member 31.

The outer vertical wall 25 is of relatively low height, and is bounded by an upper horizontal edge 43.

The second suspension elements 13 are also substantially similar and symmetrical, and accordingly, a detailed description will be made of only one of said elements. The element 13 includes a channel-shaped member 44, including a lower horizontal wall 45, a vertically disposed side wall 46 and an upper horizontal wall 47.

Referring to FIGURE 1 in the drawing, the lower wall 45 mounts at the outer end thereof a generally rectangularly-shaped nylon glide member 48 having a curved upper surface 49 and a shank or pintle mounting member 50. Immediately adjacent thereto is a vertically arranged glide member 52 supported by the vertical side wall 46 of the channel-shaped member 44.

The upper wall 47 includes an upper surface 55 and a lower surface 56 adapted to contact the upper surface 33 of the bearing member 31 as best seen in FIGURE 3.

During the sliding motion of the drawer inwardly and outwardly of the structure (not shown) in which it is mounted, the weight of the drawer and its contents will principally be borne by the glide member 48. As the center of gravity of the drawer is shifted outwardly of the supporting structure, this weight is counterbalanced by contact of the bearing member 31 against the lower surface 56 of the upper wall 47. Any sidewise or lateral movement with respect to the principal axis of the drawer is compensated by a reaction from the glide member 52, and contact of the peripheral surface 34 with the corresponding vertical side wall 46 of the second suspension element 13. Because of the single mounting pintle or stud 35, rotation of the member 31 is possible, thus further reducing any frictional resistance which might be encountered between the member 31 and the inner surface of the side wall 46.

I wish it to be understood that I do not consider the invention limited to the precise details of structure shown and set forth in this specification, for obvious modifications will occur to those skilled in the art to which the invention pertains.

I claim:

Improved bearing structure for a suspension-type drawer, comprising: a first suspension element fixed to said drawer, a second suspension element slidably engaged with said first suspension element; said first suspension element including a generally upwardly directed channel member having an inner vertical wall, a lower wall, and an outer vertical wall; a horizontally disposed flange extending outwardly of said inner wall, a synthetic resinous bearing member of button-like configuration having a planar upper surface and an arcuate peripheral surface mounted upon said horizontally disposed flange and extending outwardly thereof; a second synthetic resinous bearing member mounted upon the lower surface of said lower wall; said second suspension element being slidably engaged with said first suspension element, and having a lower horizontal wall, and an outer vertical wall and an upper horizontal wall, said last-mentioned walls forming a channel surrounding said first suspension element wherein said upper surface of said first bearing member contacts the undersurface of said upper horizontal wall, and said peripheral surface may contact the inwardly disposed surface of said outer vertical wall thereof; said first bearing member having a pivotal mounting means permitting rotation thereof about an axis passing through the center of curvature of the peripheral surface thereof.

References Cited

UNITED STATES PATENTS

| | | | |
|---|---|---|---|
| 2,318,800 | 5/1943 | Rakow. | |
| 2,514,664 | 7/1950 | Miller et al. | 312—344 |
| 2,646,333 | 7/1953 | Abrahamson et al. | 312—341 |
| 2,653,852 | 9/1953 | Bissman | 312—341 |
| 2,780,510 | 2/1957 | Cole | 312—341 X |
| 2,822,232 | 2/1958 | Lhuta | 312—341 |
| 3,095,250 | 6/1963 | Fredrick | 312—341 |

FOREIGN PATENTS

| | | |
|---|---|---|
| 1,210,451 | 9/1959 | France. |

DAVID J. WILLIAMOWSKY, *Primary Examiner.*

JAMES T. McCALL, *Examiner.*